United States Patent Office 3,151,941
Patented Oct. 6, 1964

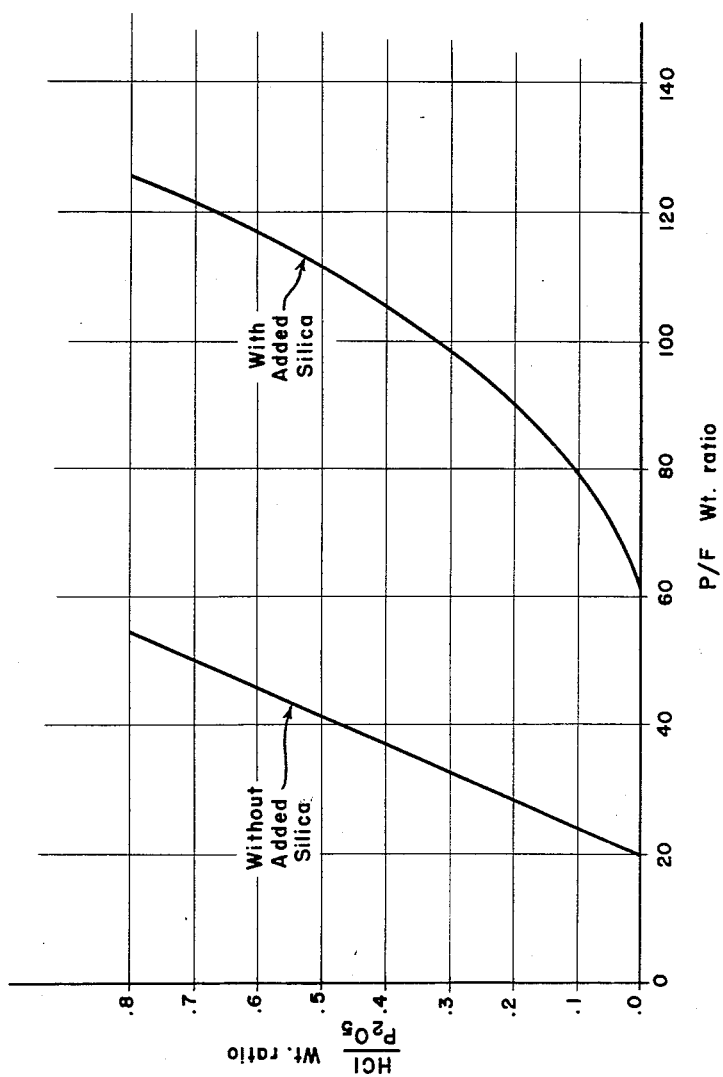
INVENTORS
Clinton A. Hollingsworth
Wiley C. Austin
Louis J. Lamb

3,151,941
DEFLUORINATION OF PHOSPHORIC ACID
Clinton A. Hollingsworth, Lakeland, Louis J. Lamb, Land O'Lakes, and Wiley C. Austin, Plant City, Fla., assignors to Smith-Douglass Company, Incorporated, Norfolk, Va., a corporation of Virginia
Filed May 2, 1960, Ser. No. 26,145
12 Claims. (Cl. 23—165)

This invention relates to the production of phosphoric acid, and more particularly to a process for defluorinating phosphoric acid produced by the acidulation of phosphate rock and similar fluoride-containing phosphatic materials.

Wet process phosphoric acid is produced by the acidulation of naturally occurring phosphatic materials with sulfuric acid, the resulting phosphoric acid being separated from the insoluble products of the acidulation reaction by filtration or the like and, if desired, being concentrated to obtain a phosphoric acid product containing at least 40%, and preferably at least 50%, by weight $P_2O_5$. The phosphatic raw material commonly contains an appreciable amount of combined fluorine—for example, Florida phosphate rock ordinarily contains about 4% by weight of combined fluorine—and as a consequence wet process phosphoric acid produced therefrom also contains an appreciable amount of fluorine. The presence of fluorine in wet process phosphoric acid makes the acid unsuitable or undesirable for many purposes such, for example, as the manufacture of high quality plant fertilizers or animal food supplements which are required to contain less than one part by weight of fluorine per 100 parts by weight of phosphorus. Accordingly, it is necessary to defluorinate such wet process phosphoric acid before it can be used in the manufacture of fertilizers and animal food supplements.

A number of processes for defluorinating wet process phosphoric acid have been developed, and these processes include precipitation and filtration of the fluorides, steam or air-stripping of the fluorides, and simple concentration of the acid in the course of which some of the more volatile fluorides are also evolved from the acid solution. However, with the exception of simple concentration, all of these prior art defluorination processes are expensive or wasteful of phosphorus, or both. Moreover, although simple concentration of the acid is the most economical method of defluorination heretofore discovered, it is not possible by this method to achieve the high phosphorus to fluorine weight ratios required of today's high quality fertilizers and animal food supplements.

As a result of an intensive investigation directed to the development of an efficient and commercially economic process for defluorinating wet process phosphoric acid, we have made the surprising discovery that when fluoride-containing phosphoric acid is concentrated in the presence of certain mineral acids, and preferably when the phosphoric acid is also treated with reactive silica, the fluorine content of the resulting concentrated phosphoric acid product is sufficiently reduced so that the acid is suitable for use in the preparation of high quality fertilizers and animal feed supplements. Specifically, our new process for defluorinating phosphoric acid comprises forming a mixture of the fluoride-containing phosphoric acid with an amount of a volatile mineral acid such that the weight ratio of the mineral acid (calculated as equivalent HCl) to the phosphoric acid (calculated as $P_2O_5$) in the mixture is at least about 0.1, followed by heating the fluoride-containing acid mixture to a temperature sufficient to vaporize the volatile fluoride constituents of the mixture, and finally recovering the desired defluorinated phosphoric acid product. The volatile mineral acid employed is preferably hydrochloric acid, nitric acid or perchloric acid, and prior to concentration the fluoride-containing phosphoric acid is preferably treated with an amount of reactive silica sufficient to convert to fluosilicic acid all of the fluorides present in the acid mixture not already present in the form of fluosilicic acid. Moreover, in order to obtain a defluorinated concentrated phosphoric acid product useful in the manufacture of animal feed supplements, the concentrated acid should contain at least 40%, and preferably at least 50%, by weight of $P_2O_5$ and less than one part by weight of fluorine per 100 parts by weight of phosphorus.

Our new process can be used to defluorinate any fluoride-containing aqueous solution of phosphoric acid, and is particularly useful in the defluorination of wet process phosphoric acid obtained by the acidulation of phosphate rock. After filtration to remove gypsum and other insoluble matter, wet process phosphoric acid commonly contains between 25 and 30% by weight of $P_2O_5$ and about one part by weight of fluorine per six parts by weight of phosphorus—e.g., a typical wet process acid direct from the filters (hereinafter referred to as "filter acid") contains about 12% by weight of phosphorus, about 2% by weight of fluorine and has a phosphorus to fluorine (P/F) weight ratio of about 6. After concentration of such wet process phosphoric acid pursuant to the practice of our invention, the resulting defluorinated phosphoric acid preferably contains at least about 50% by weight of $P_2O_5$ and has a phosphorus to fluorine (P/F) weight ratio of at least 100.

The mineral acid employed in our process can be any acid more volatile than phosphoric acid which will form water soluble calcium salts, and thus includes the halogen acids (except hydrofluoric acid), nitrogenous acids and the like. However, we presently prefer to use hydrochloric acid, nitric acid, perchloric acid or mixtures of these acids, and the practice of our invention will be described specifically in connection with the use of hydrochloric acid. The amount of volatile mineral acid added to the fluoride containing phosphoric acid should be such that the weight ratio of the mineral acid (calculated as the amount of HCl equivalent thereto) to the phosphoric acid (calculated as $P_2O_5$) in the acid mixture is at least about 0.1, and preferably is between 0.3 to 0.8. Mineral acid to phosphoric acid ratios (hereinafter referred to as the $HCl/P_2O_5$ weight ratio) of less than about 0.1 result in inefficient or incomplete defluorination of the phosphoric acid whereas $HCl/P_2O_5$ weight ratios in excess of about 0.8 will give satisfactory results but are unnecessary and uneconomic in order to obtain a substantially completely defluorinated phosphoric acid product. When mineral acids other than hydrochloric acid are employed, the aforementioned weight ratio is determined by converting the actual weight of mineral acid present in the acid mixture to the weight of an equivalent amount of hydrochloric acid.

In addition to a volatile mineral acid, we have found that the presence of a minor amount of silica in the acid mixture aids in the defluorination of the phosphoric acid, apparently by combining with the fluorine content thereof to form volatile fluorides that are evolved more readily from the acid mixture during the concentration operation. Accordingly, we have found it advantageous to add a minor amount of reactive silica such as diatomaceous earth, silica gel, and other extremely finely divided or amorphous forms of silica to the phosphoric acid, the amount of added reactive silica being sufficient to convert to fluosilicic acid all of the fluorides present in the acid mixture not already present in the form of fluosilicic acid. Moreover, when reactive silica is employed, it can be added directly to the digester in which the acidulation of the phosphate rock is carried out or to the filter acid prior to the concentration operation.

In the practice of our invention the fluoride-containing phosphoric acid (e.g., wet process filter acid), advantageously also containing a small amount of reactive silica, is mixed with the specified amount of the volatile mineral acid (e.g., hydrochloric acid) and the acid mixture is heated to a temperature (e.g., between 100° and 500° F.) sufficient to volatilize the volatile fluoride constituents of the mixture together with a substantial portion of the water and hydrochloric acid content of the mixture. The extent to which fluorine is evolved and removed from the acid mixture is dependent upon the particular volatile acid employed, the amount of volatile acid employed and the degree to which the acid mixture is concentrated. In order to obtain a defluorinated phosphoric acid product useful in the production of high quality fertilizers and animal food concentrates the concentration of the acid mixture should be continued until it contains at least about 40%, and preferably at least about 50%, by weight of $P_2O_5$, and preferably until the weight ratio of phosphorus to fluorine (P/F weight ratio) of the acid is at least 100.

The concentration and defluorination of the acid mixture can be carried out in conventional concentration apparatus such, for example, as tube evaporators, spray dryers, rotary or drum dryers, falling film evaporators and the like. The concentrated acid product is recovered from the concentrator and, if desired, is clarified by, for example, filtration for subsequent use. The volatilized constituents of the acid mixture are withdrawn from the concentrator and are condensed in suitable condensing apparatus. If desired, the resulting condensate is treated with, for example, a soluble sodium or potassium salt to precipitate and recover the fluoride content of the condensate. The remaining condensate comprises predominately a dilute solution of hydrochloric acid and advantageously is recycled to the start of the defluorination and concentration operation of our process.

The following examples are illustrative but not limitative of the practice of our invention.

EXAMPLE I

Wet process phosphoric acid, obtained direct from the filters, was employed in a series of tests in which varying amounts of hydrochloric acid were mixed with samples of the phosphoric acid and the resulting acid mixtures were concentrated in accordance with our invention. The wet process filter acid contained 28.38% by weight $P_2O_5$, 12.30% by weight P, 2.04% by weight F, and had a P/F weight ratio of 6. The hydrochloric acid employed contained 38.4% HCl, and to one half of the samples of acid was added a theoretical amount of reactive silica in the form of diatomaceous earth.

Eight samples of equal weight of the filter acid were placed in separate vessels, and a theoretical amount of reactive silica was added to four of the samples to form two sets of acid samples one of which contained reactive silica and the other of which did not contain reactive silica. Specific amounts of hydrochloric acid were added to six of the samples so that two samples (one with reactive silica and one without reactive silica) had a $HCl/P_2O_5$ weight ratio of 0.8, two had a $HCl/P_2O_5$ weight ratio of 0.5, two had a $HCl/P_2O_5$ weight ratio of 0.2, and two had a $HCl/P_2O_5$ weight ratio of 0.0. All of the samples were then heated at atmospheric pressure to a temperature of about 280° F. resulting in a $P_2O_5$ concentration of about 54%. The samples were then cooled and analyzed for their phosphorus, fluorine and chlorine content, the results of this concentration operation being summarized in the following table:

Table I

| | HCl/$P_2O_5$, wt. ratio | Analysis | | | | |
|---|---|---|---|---|---|---|
| | | $P_2O_5$, wt. percent | P, wt. percent | F, wt. percent | P/F wt. ratio | Cl, wt. percent |
| Filter Acid | | 28.38 | 12.39 | 2.04 | 6.1 | -------- |
| Concentrated Acid: | | | | | | |
| Without Silica | 0.0 | 54 | 23.56 | 1.24 | 19 | -------- |
| | 0.2 | 54 | 23.56 | 0.84 | 28 | 0.21 |
| | 0.5 | 54 | 23.56 | 0.57 | 41 | Trace |
| | 0.8 | 54 | 23.56 | 0.44 | 54 | 0.85 |
| With Silica | 0.0 | 54 | 23.56 | 0.38 | 62 | -------- |
| | 0.2 | 54 | 23.56 | 0.27 | 87 | 0.07 |
| | 0.5 | 54 | 23.56 | 0.21 | 112 | 0.32 |
| | 0.8 | 54 | 23.56 | 0.19 | 124 | 0.97 |

The results of the foregoing tests clearly demonstrate the increase in the degree of defluorination of the concentrated phosphoric acid that is made possible by the addition of hydrochloric acid thereto prior to the concentration operation, and also the beneficial effect of the addition of reactive silica to the filter acid prior to the defluorination and concentration operation. The foregoing data is represented graphically in the single figure of the drawing.

EXAMPLE II

In a second series of tests wet process filter acid was concentrated in a falling film evaporator in which a thin film of the phosphoric acid being concentrated was maintained in contact with the inner surface of the heated cylindrical wall of the evaporator by means of internal rotating blades. Two phosphoric acid feed materials were employed in the tests, one feed material consisting of wet process filter acid without any addition of hydrochloric acid or reactive silica and the other feed material consisting of wet process filter acid to which a sufficient amount of hydrochloric acid had been added to provide a HCl/$P_2O_5$ weight ratio of 0.3 and to which had also been added a theoretical amount of reactive silica. In each test the phosphoric acid feed was continuously introduced into the evaporator, and concentrated acid and effluent vapors were continuously withdrawn from the evaporator. The concentration of the phosphoric acid was controlled by regulating the feed rate and the temperature of the evaporating surfaces, and samples of the product and the distillate were collected for each test and were analyzed for their phosphorus, fluorine and chlorine content. The results of the test are set forth in the following table:

Table II

| | Analysis | | | | |
|---|---|---|---|---|---|
| | $P_2O_5$, wt. percent | P, wt. percent | F, wt. percent | P/F wt. ratio | Cl, wt. percent |
| Filter acid (w/o HCl): | | | | | |
| Feed | 28.38 | 12.39 | 2.04 | 6 | -------- |
| Concentrate: | | | | | |
| Test No. 1A | 44.40 | 19.39 | 2.84 | 7 | -------- |
| Test No. 2A | 50.80 | 22.18 | 2.22 | 10 | -------- |
| Test No. 3A | 58.12 | 25.38 | 1.32 | 19 | -------- |
| Filter acid with HCl [1]: | | | | | |
| Feed | 23.2 | 10.1 | 1.7 | 6 | 7.0 |
| Concentrate: | | | | | |
| Test No. 1B | 44.44 | 19.40 | 0.66 | 29 | 2.91 |
| Test No. 2B | 50.08 | 21.87 | 0.61 | 36 | 0.91 |
| Test No. 3B | 58.46 | 25.52 | 0.23 | 111 | 0.31 |

[1] (HCl/$P_2O_5$ weight ratio of 0.3.)

The distillates obtained from the evaporator were condensed and analyzed and were found to be substantially free of phosphorus, the amount of phosphorus recovered in the concentrated acid being more than 99.9% of that present in the original acid. The results of the foregoing tests demonstrate the increase in the degree of defluorination that is obtained as the concentration of the acid product is increased, and again clearly demonstrate the increase in the degree of defluorination of the phosphoric acid product made possible by the addition of hydrochloric acid thereto prior to the concentration operation.

EXAMPLE III

In a third series of tests five samples of identical wet process filter acid were placed in separate vessels, and the five samples were concentrated by heating at atmospheric pressure to determine the effectiveness of various defluorinating reagents added to the samples. One sample contained no added defluorinating reagent, the second sample contained a theoretical amount of reactive silica, the third sample contained an amount of nitric acid such that the equivalent $HCl/P_2O_5$ weight ratio was 0.3, the fourth sample contained same amount of nitric acid as in the third sample together with a theoretical amount of reactive silica, and the fifth sample contained an amount of perchloric acid such that the equivalent $HCl/P_2O_5$ weight ratio was 0.3. On completion of the concentration and defluorinating operation, the samples of the resulting phosphoric acid products were analyzed with the following results:

*Table III*

|  | Analysis | | | | |
| --- | --- | --- | --- | --- | --- |
|  | $P_2O_5$, wt. percent | P, wt. percent | F, wt. percent | P/F, wt. ratio | B.P., °C. |
| Filter acid | 28.55 | 12.46 | 1.93 | 7 | |
| Concentrated acid: | | | | | |
| No additives | 52.86 | 23.07 | 0.45 | 51 | 130 |
| With $SiO_2$ | 50.97 | 22.24 | 0.338 | 66 | 130 |
| With $HNO_3$ | 59.42 | 25.93 | 0.3 | 86 | 155 |
| With $HNO_3+SiO_2$ | 53.51 | 23.35 | 0.114 | 205 | |
| With $HClO_4$ | 44.65 | 19.49 | 0.045 | 433 | 233 |

The defluorinated sample concentrated in the presence of nitric acid and reactive silica contained 2.94% by weight of nitric acid upon completion of the concentration operation. The sample concentrated in the presence of perchloric acid reported in Table III was further concentrated to obtain a phosphoric acid product containing 73.96% by weight of $P_2O_5$. The P/F weight ratio of this highly concentrated sample was 14,700 and it contained 1.49% by weight of residual perchloric acid.

The results of the foregoing tests demonstrate the significant improvement in the degree of defluorination of phosphoric acid that is obtained when the dilute filter acid is concentrated in the presence of such volatile mineral acids as nitric acid and perchloric acid. The tests results also demonstrate that the degree of defluorination obtained is dependent upon both the particular mineral acid employed and upon the ultimate concentration of the phosphoric acid product.

From the foregoing description of our new process for defluorinating phosphoric acid it will be appreciated that we have made an important contribution to the art to which our invention relates.

We claim:

1. Process for concentrating and defluorinating fluoride-containing aqueous solutions of phosphoric acid which comprises forming a mixture of the fluoride-containing aqueous solution of phosphoric acid with an amount of a mineral acid selected from a group consisting of hydrochloric acid, nitric acid and perchloric acid such that the weight ratio of said mineral acid (calculated as equivalent HCl) to phosphoric acid (calculated as $P_2O_5$) in the mixture is at least about 0.1, heating the aqueous solution of the fluoride-containing acid mixture to a temperature between about 100° and 500° F. to vaporize the volatile fluoride constituents of the mixture, and recovering the resulting concentrated and defluorinated phosphoric acid product.

2. Process according to claim 1 in which the weight ratio of volatile mineral acid (calculated as equivalent HCl) to phosphoric acid (calculated as $P_2O_5$) is between about 0.3 and 0.8.

3. Process according to claim 1 in which the fluoride-containing acid mixture is heated for a period of time sufficient to reduce the fluorine content of the acid mixture to less than one part of fluorine per 100 parts of phosphorus by weight.

4. Process according to claim 1 in which the fluoride-containing acid mixture is heated to a temperature between about 100° and 500° F. to volatilize the volatile fluoride constituents of the mixture for a period of time sufficient to reduce the fluorine content of the acid mixture to less than one part of fluorine per 100 parts of phosphorus by weight and to produce concentrated phosphoric acid containing at least 40% by weight $P_2O_5$.

5. Process according to claim 1 in which the acid mixture is concentrated to obtain a defluorinated phosphoric acid product containing at least about 50% by weight of phosphorus (calculated as $P_2O_5$).

6. Process for concentrating and defluorinating fluoride-containing aqueous solutions of phosphoric acid which comprises forming a mixture of the fluoride-containing aqueous solution of phosphoric acid with an amount of a mineral acid selected from a group consisting of hydrochloric acid, nitric acid and perchloric acid such that the weight ratio of said mineral acid (calculated as equivalent HCl) to phosphoric acid (calculated as $P_2O_5$) in the acid mixture is at least about 0.1 and with an amount of finely divided silica sufficient to convert to fluosilicic acid all of the fluorides present in the acid mixture not already present in the form of fluosilicic acid, heating the aqueous solution of the fluoride-containing acid mixture to a temperature between about 100° and 500° F. to volatilize the volatile fluoride constituents of the mixture and recovering the resulting concentrated and defluorinated phosphoric acid product.

7. Process according to claim 6 in which the weight ratio of volatile mineral acid (calculated as equivalent HCl) to phosphoric acid (calculated as $P_2O_5$) is between about 0.3 and 0.8.

8. Process according to claim 6 in which the volatile mineral acid is selected from the group consisting of hydrochloric acid, nitric acid and perchloric acid.

9. Process according to claim 6 in which the fluoride-containing acid mixture is heated to a temperature sufficient to volatilize the volatile fluoride constituents of the acid mixture for a period of time sufficient to reduce the fluorine content of the mixture to less than one part of fluorine per 100 parts of phosphorus and sufficient to produce phosphoric acid containing at least about 40% by weight of phosphorus (calculated as $P_2O_5$).

10. Process according to claim 6 in which the reactive silica is added to the phosphoric acid during the production of the phosphoric acid by the acidulation of phosphate rock.

11. Process according to claim 6 in which the acid mixture is concentrated to obtain a phosphoric acid product containing at least about 50% by weight of phosphorus (calculated as $P_2O_5$).

12. Process for concentrating and defluorinating phosphoric acid obtained by the acidulation of fluoride-containing phosphate rock which comprises forming a mixture of an aqueous solution of the fluoride-containing phosphoric acid with an amount of hydrochloric acid such that the weight ratio of hydrochloric acid (calculated as HCl) to phosphoric acid (calculated as $P_2O_5$) is at least 0.1 and with an amount of finely divided silica at least sufficient to convert to fluosilicic acid all of the fluorides present in the acid mixture not already present in this form, heating the aqueous solution of the fluoride-containing acid mixture to a temperature of between about 100° to 500° F. for a period of time sufficient to reduce the fluorine content of the mixture to less than one part of fluorine per 100 parts of phosphorus and sufficient to produce phosphoric acid containing at least about 40% by weight of phosphorus (calculated as $P_2O_5$), and recovering the resulting concentrated and defluorinated phosphoric acid product.

References Cited in the file of this patent

UNITED STATES PATENTS

| | | |
|---|---|---|
| 2,123,785 | Knox et al. | July 12, 1938 |
| 2,165,100 | Hettrick | July 4, 1939 |
| 2,504,446 | Plusje | Apr. 18, 1950 |
| 2,636,806 | Winter | Apr. 28, 1953 |
| 2,778,722 | Hollingsworth | Jan. 22, 1957 |
| 2,849,280 | Le Baron et al. | Aug. 26, 1958 |
| 2,987,376 | Gloss | June 6, 1961 |
| 3,002,812 | Williams | Oct. 3, 1961 |